(12) United States Patent
Frank

(10) Patent No.: US 8,064,173 B2
(45) Date of Patent: Nov. 22, 2011

(54) ENERGIZING CAPACITOR LOADS

(75) Inventor: Harry Frank, Vasteras (SE)

(73) Assignee: ABB Technology Ltd. (CH)

( * ) Notice: Subject to any disclaimer, the term of this patent is extended or adjusted under 35 U.S.C. 154(b) by 760 days.

(21) Appl. No.: 10/559,288

(22) PCT Filed: Jun. 4, 2004

(86) PCT No.: PCT/IB2004/001837
§ 371 (c)(1),
(2), (4) Date: Dec. 2, 2005

(87) PCT Pub. No.: WO2004/109886
PCT Pub. Date: Dec. 16, 2004

(65) Prior Publication Data
US 2006/0126234 A1    Jun. 15, 2006

Related U.S. Application Data

(60) Provisional application No. 60/475,499, filed on Jun. 4, 2003.

(51) Int. Cl.
*H02H 3/00* (2006.01)
(52) U.S. Cl. .................................. 361/2; 361/3
(58) Field of Classification Search ............... 361/2, 3; 307/109, 110, 141
See application file for complete search history.

(56) References Cited

U.S. PATENT DOCUMENTS 6,960,844 B1 * 11/2005 Al-Hosini et al. ........... 307/131
7,166,936 B2 * 1/2007 Larsson et al. .............. 307/141

FOREIGN PATENT DOCUMENTS
WO        0137298        5/2001
* cited by examiner

*Primary Examiner* — Jared Fureman
*Assistant Examiner* — Lucy Thomas
(74) *Attorney, Agent, or Firm* — St. Onge Steward Johnston & Reens LLC

(57) ABSTRACT

A method for providing means for energizing a capacitive load. The capacitive load is connected to an alternating current power source by using a connecting device. The connecting device comprises at least one diode and connecting organs, which can be closed or open.

13 Claims, 11 Drawing Sheets

Switching in capacitors

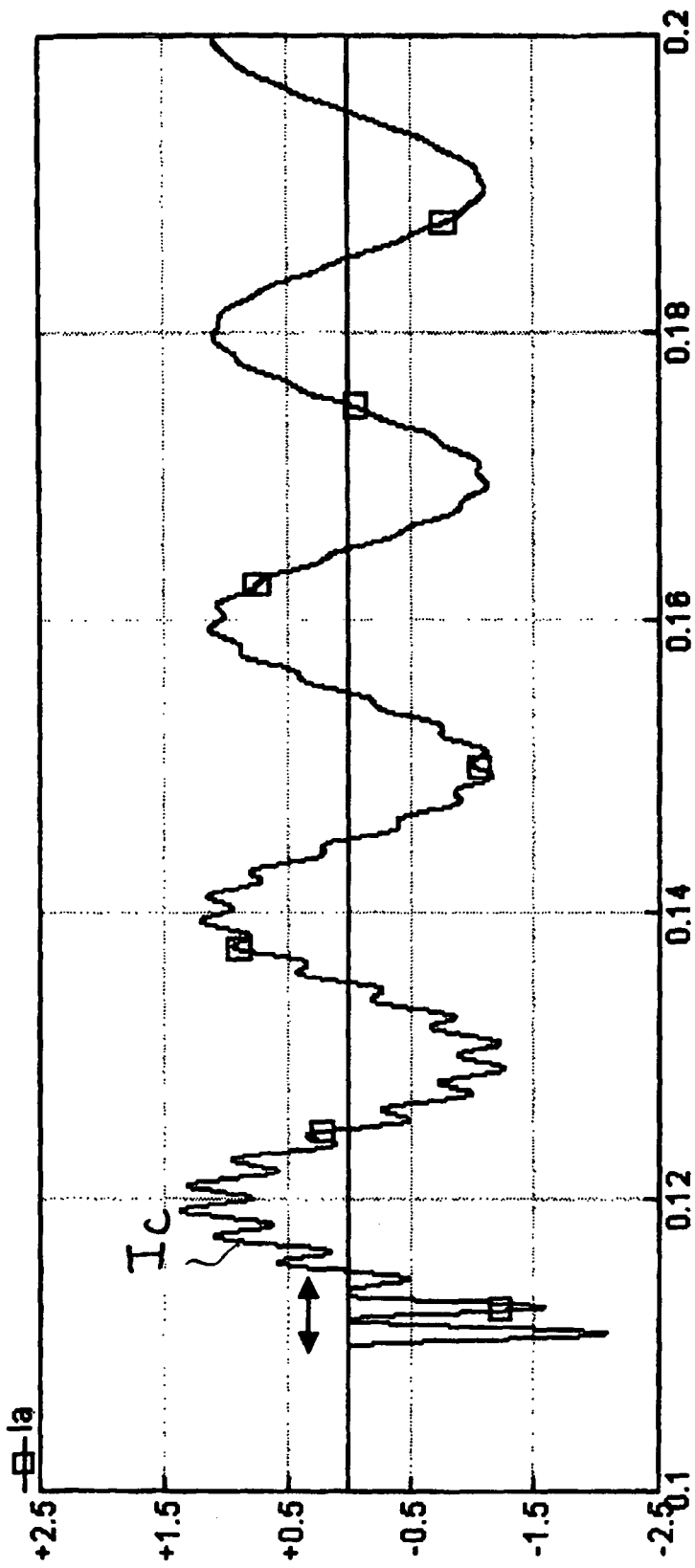
Figure 2. Inrush current when energizing capacitor bank at voltage zero and half-wave rectifying during first 1/4 of a period as indicated by the arrows.

Fully disconnected

Uc= 0 or Uc > 0

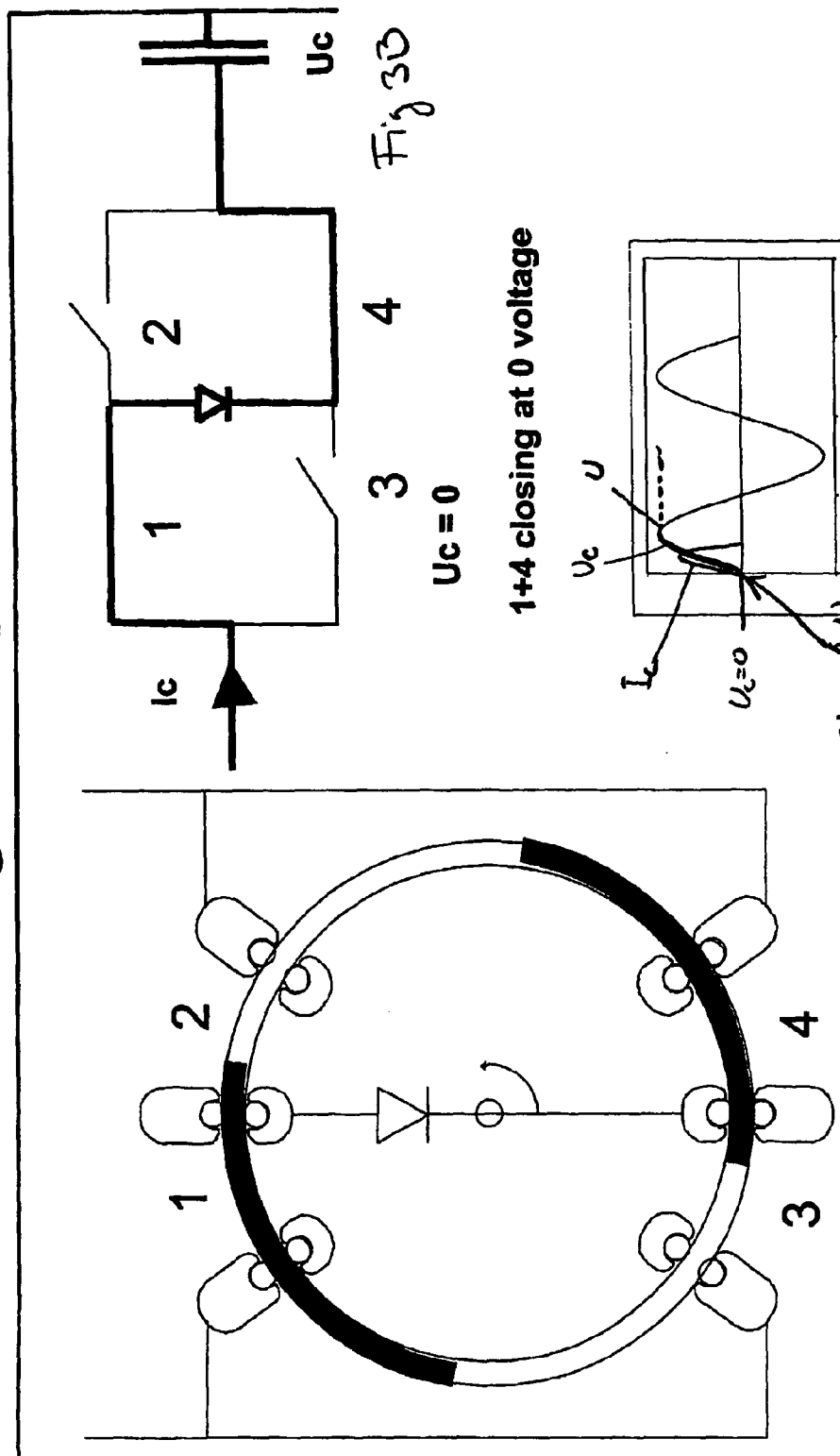

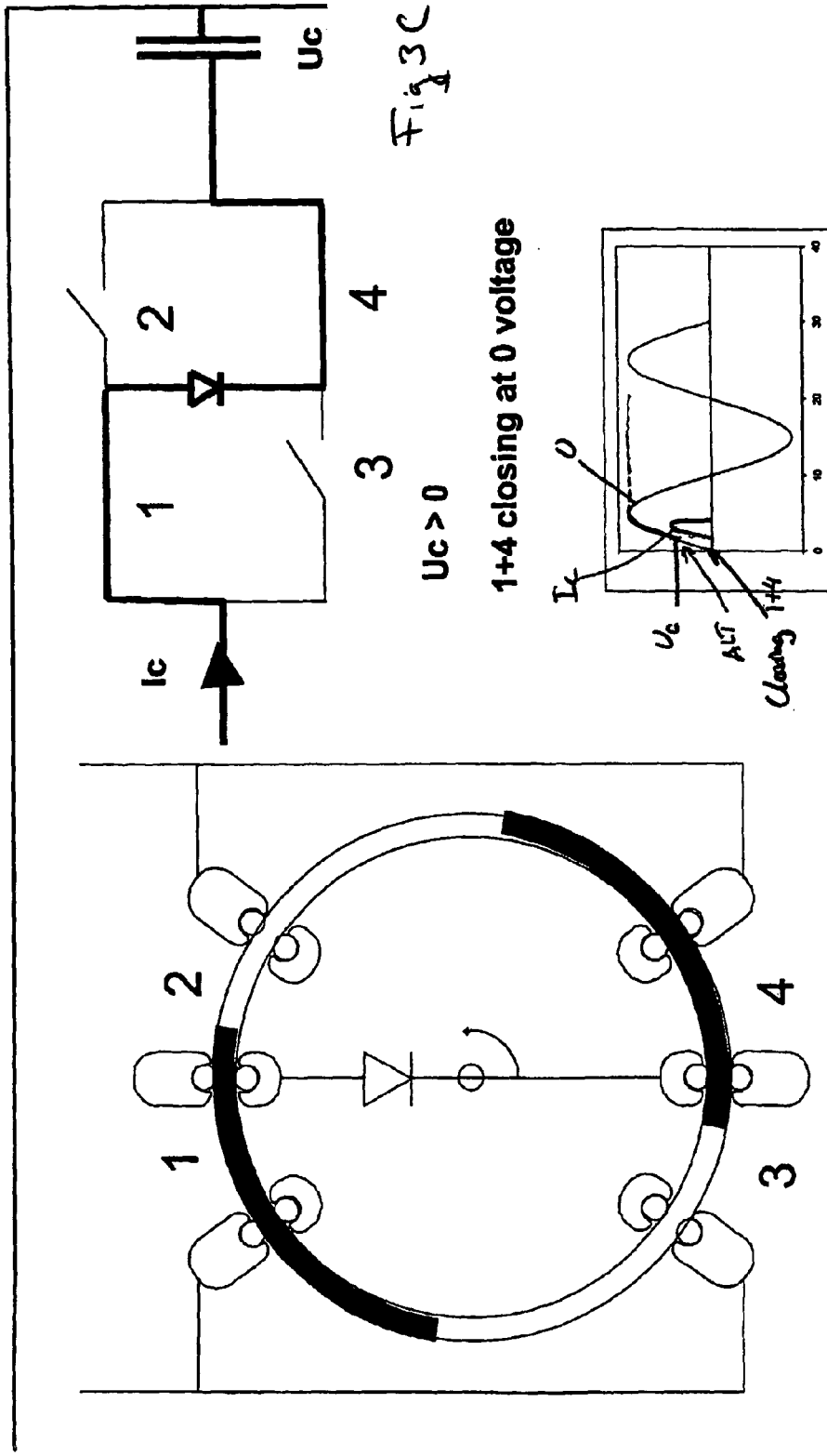

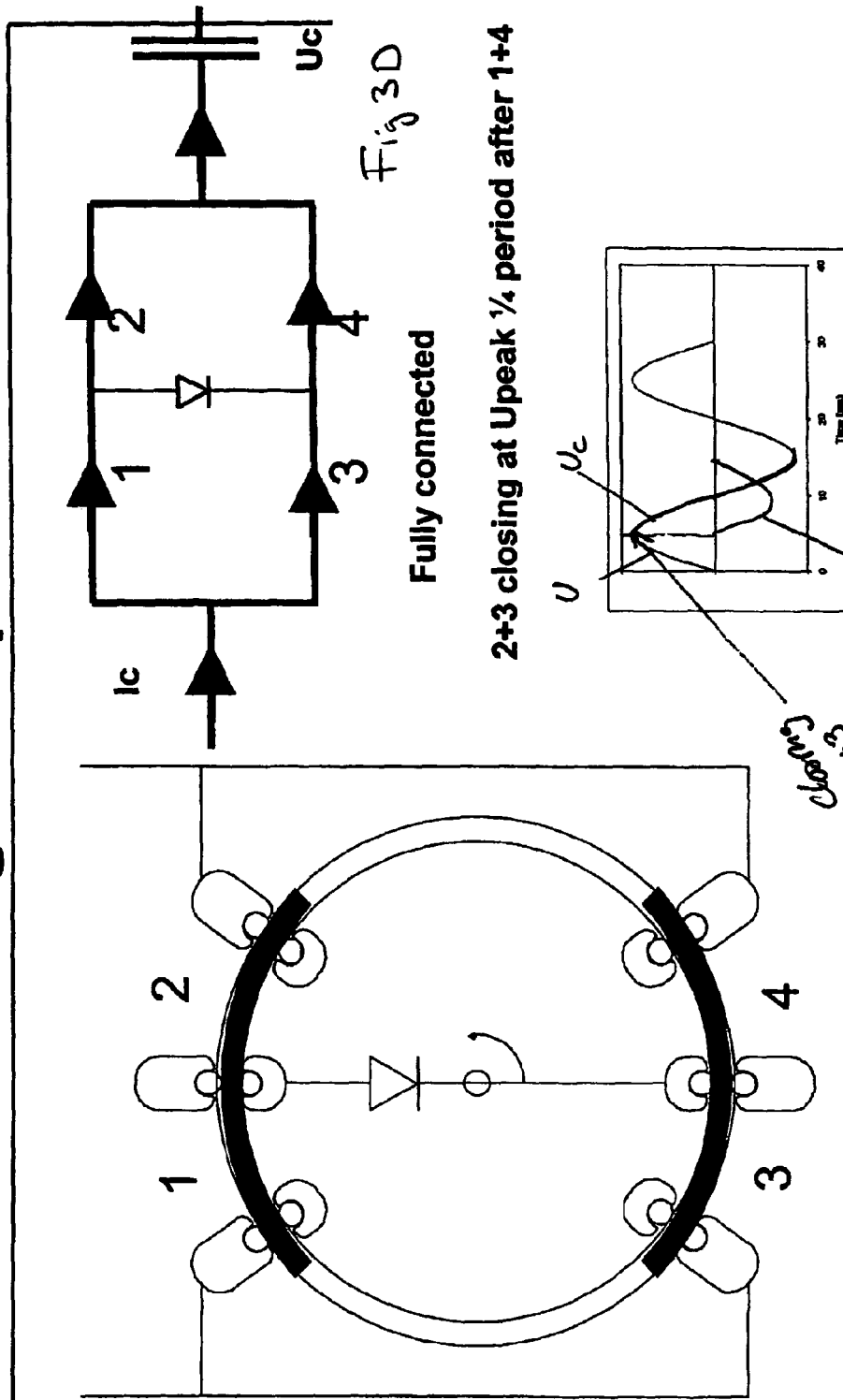

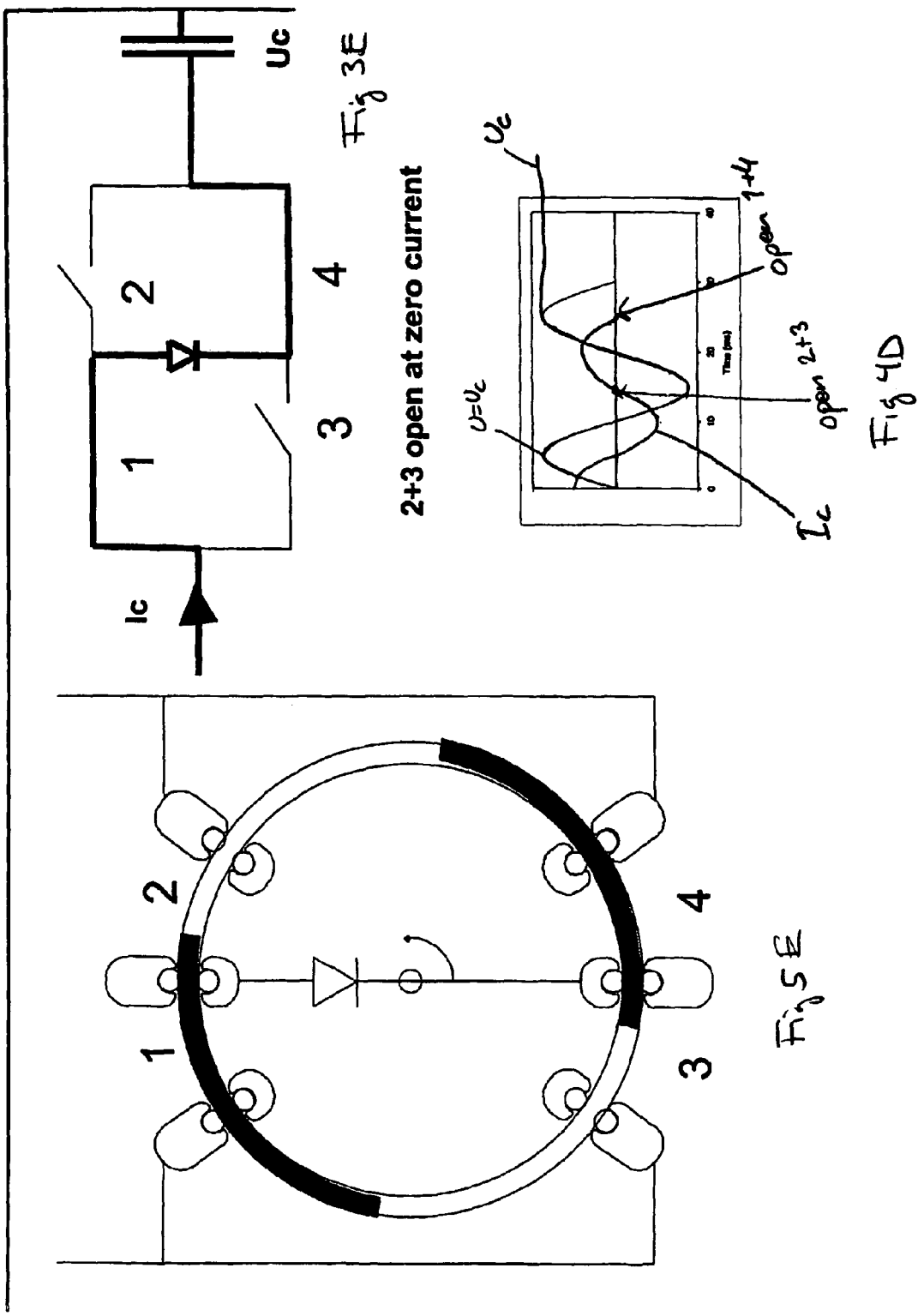

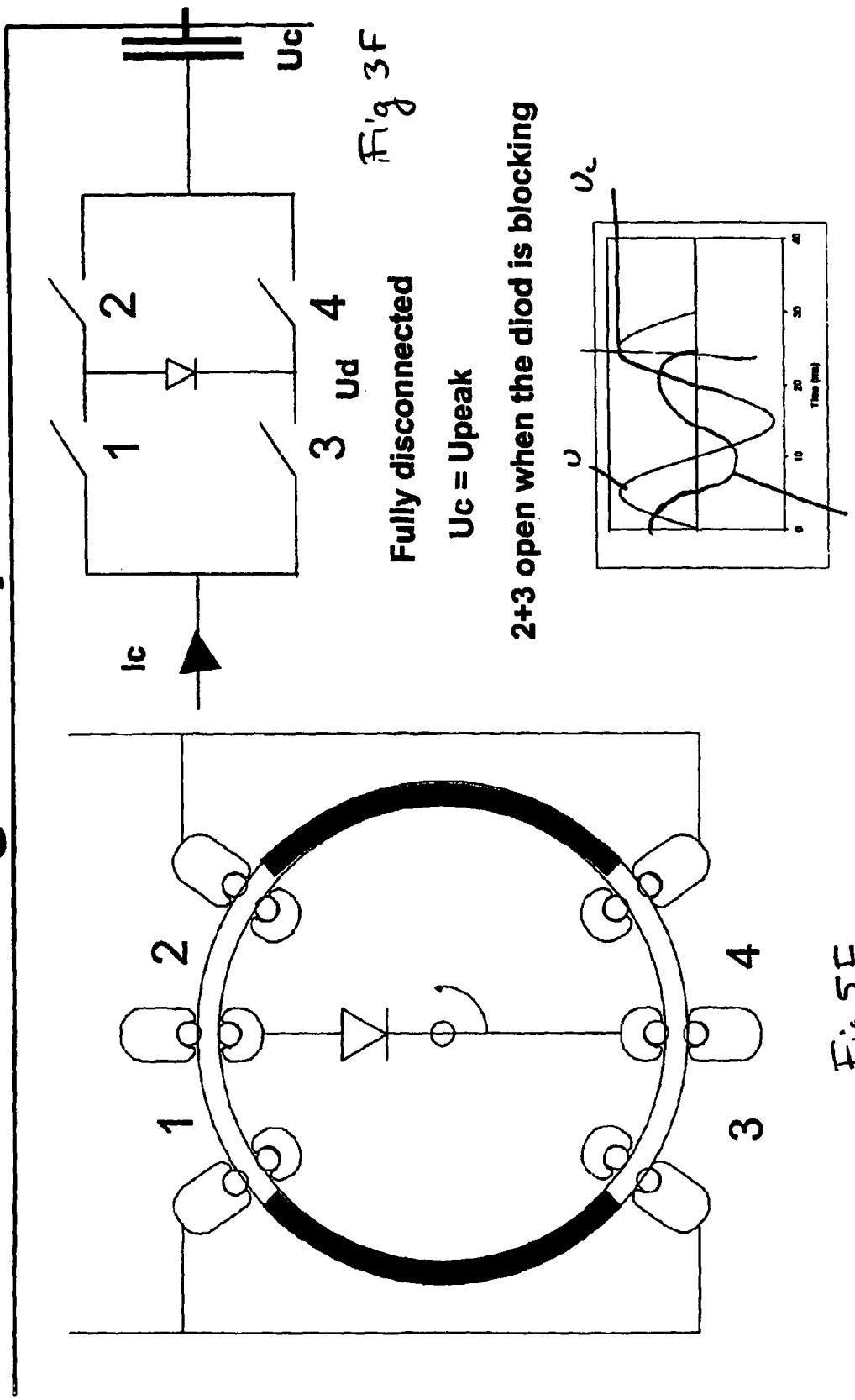

ENERGIZING CAPACITOR LOADS

TECHNICAL FIELD

The present invention is concerned with a method and a system for energizing capacitor loads.

BACKGROUND ART

A capacitor bank is, for instance, used as an energy storing device. A capacitor bank includes at least one capacitor with a first pole and a second pole. When energizing a capacitor bank, the capacitor is in this case connected by an electric switching device for alternating current to an electric power source at one of the poles, here denominated the breaker pole.

The electric switching device includes at least one breaker that has two contact members arranged in a current path through the switching device, the contact members being used for breaking/closing the current through the switching device. A suitable breaker is known from the published patent application WO0137298.

It would be advantageous to find a cost-effective and simple method to control the closing of the switching device and damp high-frequency transients that may occur.

SUMMARY OF THE INVENTION

The aim of the invention is achieved by method for energizing a capacitive load which is connected to an alternating current power source by using a connecting device that includes at least one diode and connecting parts which may be closed or open. The diode is connected between the power source and the capacitive load when the diode is in the reverse state. The diode is by-passed when the voltage from the power source substantially reaches a peak value after the diode has come into a forward conducting state.

The invention is not, of course, restricted to any particular range of operating current through such an electric switching device in the closed state, and neither to any particular voltage levels existing in the current path, but it may nevertheless be mentioned that it is particularly useful for intermediate voltage, i.e., corresponding to a 1-52 kV system voltage, in which the operating current in question typically may be 1 kA. but both lower and higher voltages and currents than these are conceivable.

It is pointed out that "contact member" comprises all types of members for opening and closing an electric circuit, in which for example, although not necessarily, physical separation of two parts while forming a gap therebetween may take place when opening the contact member, and this may, for example, take place by moving a movable contact interconnecting two contacts mutually spaced so that these are no longer in connection with each other or by the fact that a movable contact bears against a fixed contact and is moved away therefrom.

Contact members without physical separation of contacts when opening are also conceivable.

A controlled or synchronous closing can be used to mitigate inrush current and voltage transients when energizing capacitor banks. This is achieved by closing at a zero voltage across the breaker pole. Though, when closing at voltage zero there is an inrush-current that oscillates with a frequency given by the capacitor bank size and the short-circuit impedance of the supplying network. This inrush current is damped out after some time, but during this oscillation it also gives rise to voltage transients. It would therefore be beneficial to increase the damping during this time to increase power quality.

In a first preferred embodiment according to the invention a first connecting part and a second connecting part are connected in series between the power source and the capacitive load in the connecting device. The diode is connected in parallel with the second connecting part. The first connecting part is closed during the part of the voltage cycle when the diode is in the reverse state. The second connecting part is closed when the voltage from the power source reaches the peak value after the diode has come into the forward conducting state.

In another preferred embodiment according to the invention the connecting device comprises a first connecting part and a second connecting part which are connected in series in a first branch. A third connecting part and a fourth connecting part are connected in series in a second branch. The first branch and the second branch are parallel connected between the power source and the capacitive load. The diode is connected between the first connecting part and the second connecting part in one end and in the other end between the third connecting part and the fourth connecting part. The connecting parts are closed in pairs. The first pair is the first connecting part and the fourth connecting part. The second pair is the second connecting part and the third connecting part. The pair that puts the diode in a reverse state is closed first. The second pair is closed substantially when the voltage from the power source reaches the peak value after the diode has come into the forward conducting state.

For a completely discharged capacitive load this may be achieved by a connecting device including a diode in series with the breaker as a half-wave rectifier during the first fourth of a period after the capacitor has been energized with the assumption that the capacitor is fully discharged initially. The diode should be connected in such a way that the current starts to flow directly after voltage zero. After one-fourth of a period, the diode is short-circuited.

The electric switching device comprises at least two contact members arranged in a current path through the switching device and a semiconductor device capable of blocking current therethrough in at least a first blocking direction and a unit adapted to control opening of a current path through the switching device by controlling a first of the contact members to open for transferring the current through the switching device to the semiconductor device when this is in or going into the conducting state and then the second contact member to open when the semiconductor device is in a state of blocking current therethrough for breaking the current through the switching device.

It is pointed out that "conducting state" above is to be given a broad sense, and it is not necessary that a component going into or being in the conducting state really conducts, but this is also intended to cover that it may be brought to conduct at that moment should that be desired, which could be the case for a semiconductor device of turn-on type, such as a thyristor, while a passive semiconductor device in the form of a diode will instead always conduct in the conducting state as defined here.

BRIEF DESCRIPTION OF THE DRAWINGS

The present invention will be described in more detail in connection with the accompanying schematic drawings.

FIG. 2 illustrates schematically the inrush current when energizing capacitor bank at voltage zero and half-wave rectifying during the first fourth of a period as indicated by the arrows, FIGS. 3A-3F show a simplified circuit diagram illustrating an electric switching device in a closed, temporary closed and opened position, respectively, utilized when energizing a capacitor bank at voltage zero and half-wave rectifying according to a first preferred embodiment of the invention, FIGS. 4A-4E illustrate schematically the inrush current when energizing a capacitor bank at voltage zero and half-wave rectifying during according to a first preferred embodiment of the invention in a closed, temporary closed and opened position, respectively, FIGS. 5A-5F show an electric switching device according to a first preferred embodiment of the invention in a closed, temporary closed and opened position, respectively.

DESCRIPTION OF THE PREFERRED EMBODIMENTS

A method for providing means for energizing a capacitor bank comprising at least one capacitor is achieved by connecting the capacitor by means of an electric switching device for alternating current to an electric power source at one of the capacitor poles. The electric switching device includes a diode in series with a breaker as a half-wave rectifier during the first fourth of a period after the capacitor has been energized with the assumption that the capacitor is fully discharged initially. The diode should be connected in such a way that the current starts to flow directly after voltage zero. After one-fourth of a period the diode is short-circuited.

Figure 1:
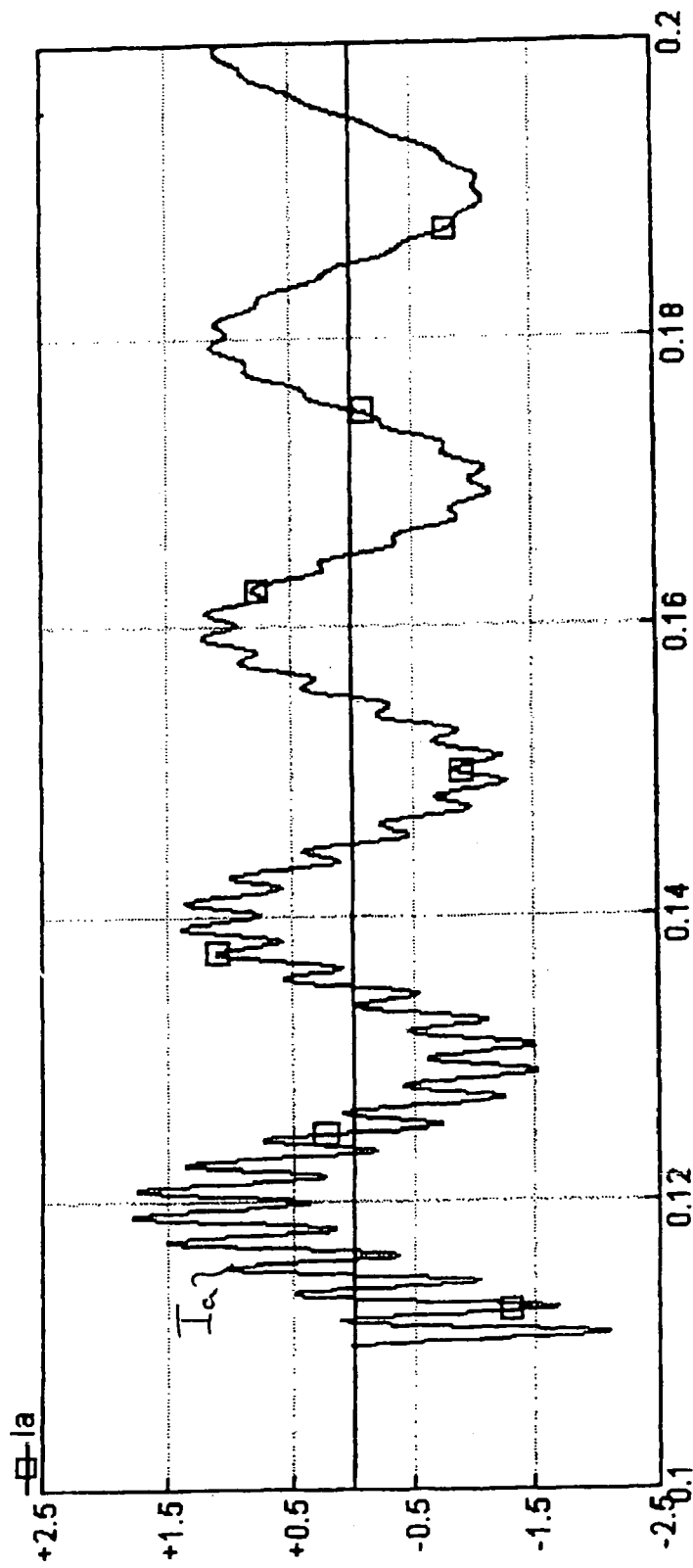
FIG. 1 (prior art) illustrates schematically the inrush current when energizing capacitor bank at voltage zero.

FIG. 1 shows the inrush current 1a of a normal synchronized closing of a capacitor bank voltage zero and FIG. 2 shows the effect of synchronized closing with a diode acting as a half-wave rectifier during the first fourth of a period after energization, i.e. the inrush current Ic when energizing capacitor bank at voltage zero and half-wave rectifying during the first fourth of a period as indicated by the arrows. When comparing the two figures, it is evident that the oscillations are damped out much faster by using this described method for energizing a capacitor bank.

If the capacitor has a remaining charge, the diode should be connected to the capacitor in such a way that the diode will allow the current to flow in such a direction that it will increase the charge of the capacitor (or voltage). The diode should then be short-circuited when a peak voltage is reached. The diode direction can be determined by knowing how the first interruption was made. If the last current loop was positive, also the remaining charge will be positive at the capacitor and vice versa.

Figure 7A:
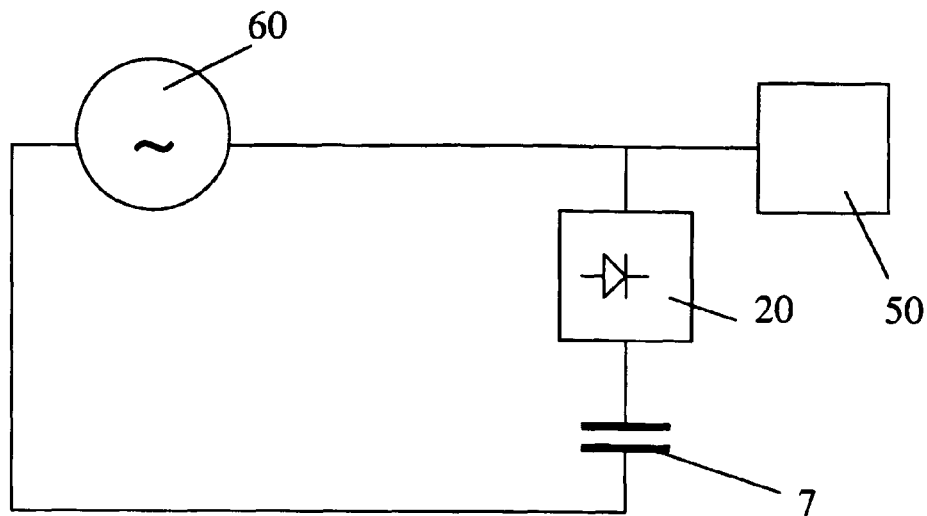
FIG. 7A shows a single line diagram of a system according to a preferred embodiment of the invention.

FIG. 7A shows a single line diagram of a system according to a preferred embodiment of the invention. The system provides means for energizing a capacitive load (7), which capacitive load is connected to a alternating ,current power source (60) by using a connecting device (20). The connecting device comprises at least one diode (8) and connecting parts, which can be closed or open. The diode is connected between the power source and the capacitive load when the diode is in the reverse state. The next step is that the diode is by-passed when the voltage from the power source reaches the peak value after the diode has come into the forward conducting state. The capacitive load is connected to the rest of the network (50) as a capacitive load.

Figure 7B:
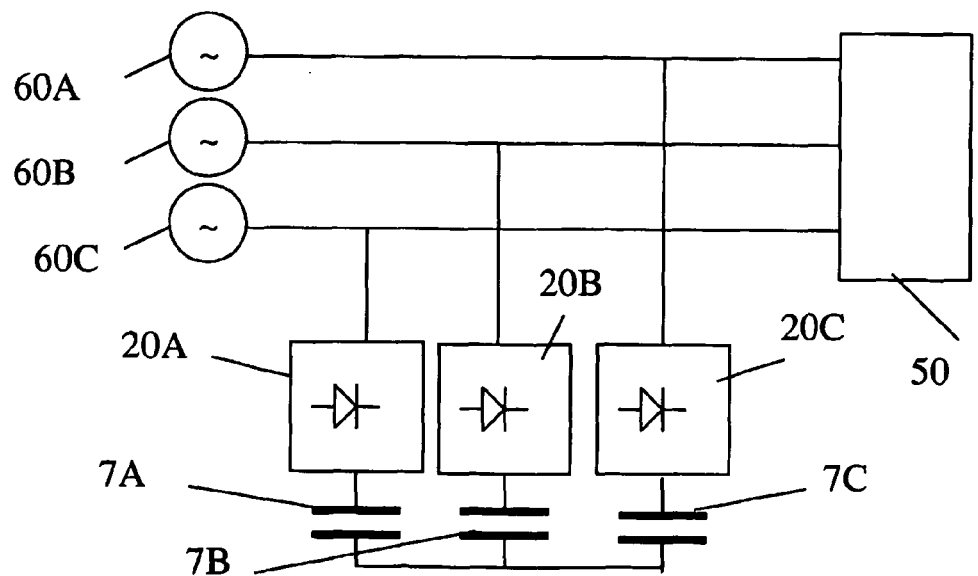
FIG. 7B shows a three-phase diagram of a system according to a preferred embodiment of the invention.

FIG. 7B shows a three-phase diagram of a system according to a preferred embodiment of the invention. The system provides means for energizing capacitive loads (7A, 7B, 7C), which capacitive loads are connected to alternating current power sources (60A, 60B, 60C) by using connecting devices (20A, 20B, 20C). The capacitive loads are connected to the rest of the network (50) as capacitive loads.

Figure 6:
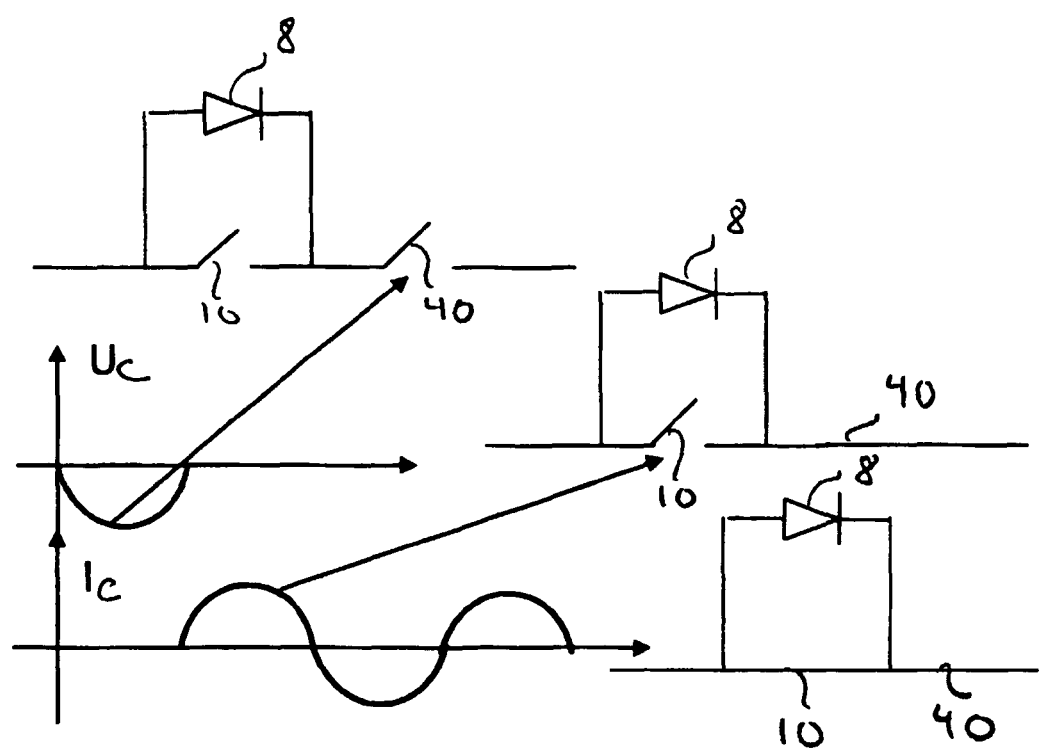
FIG. 6 shows a simplified circuit diagram illustrating an electric switching device in a closed, temporary closed and opened position, respectively, utilized when energizing a capacitor bank at voltage zero and half-wave rectifying according to another preferred method of the invention.

FIG. 6 shows a simplified circuit diagram illustrating an connecting device in a closed, temporarily closed and opened position, respectively. The connecting device comprise a first connecting part (40) and a second connecting part (10) that shall be connected in series between the power source and the capacitive load, wherein the diode is connected in parallel with the second connecting part. The connecting parts are individually operated. When energizing a capacitor load such as a capacitor bank at the first connecting part in this case a breaker 40 is closed for the first quarter of a period. The diode should be connected in such a way that the current starts to flow directly after current zero. After one-fourth of a period, the diode is short-circuited. The first connecting part is closed during the part of the voltage cycle when the diode is in the reverse state, and the second connecting part is closed when the voltage from the power source reaches the peak value after the diode has come into the forward conducting state.

Figure 8:
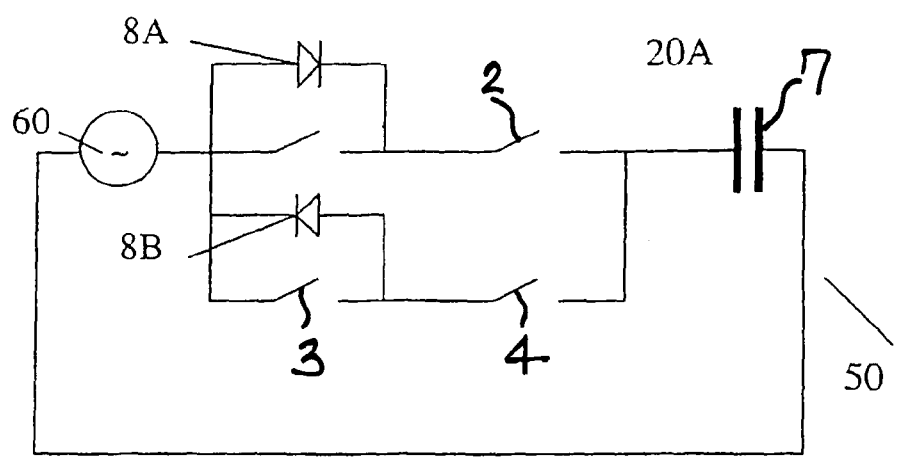
FIG. 8 shows a system according to a preferred embodiment of the invention.

FIG. 8 shows schematically a system according to another preferred embodiment of the invention. The figure shows a capacitive load (7), a first connecting part (1), a second connecting part (2), a third connecting part (3), and a fourth connecting part (4). The first connecting part and the second connecting part are connected in series in a first branch, and the third connecting part and the fourth connecting part are connected in series in a second branch, the first branch and the second branch are parallel connected between the power source and the capacitive load. Diodes 8A and 8B are respectively connected between the first connecting part and the second connecting part in one end and in the other end between the third connecting part and the fourth connecting part. The connecting parts are individually operated. So that the connecting parts are closed in pairs, the first pair is the first connecting part and the fourth connecting part, and the second pair is the second connecting part and the third connecting part, such that the pair that puts the diode in a reverse state is closed first and the second pair is closed when the voltage from the power source reaches the peak value after the diode has come into the forward conducting state.

Another preferred embodiment of a general construction of an electric switching device for alternating current according to the invention is schematically illustrated in FIGS. 3A-3F and this is connected in a current path Ic to be able to rapidly open and close this path. One such switching device is arranged per phase, so that a three-phase network has three such switching devices at one and the same location. The switching device comprises two branches 5 and 6 connected in parallel in said current path, each having at least two mechanical contact members 1-4 connected in series.

A semiconductor device 8 in the form of a diode is adapted to connect the midpoints 9, 10 between the two contact members of each branch to each other.

The switching device also comprises a detecting member 11 schematically indicated and adapted to detect the direction and magnitude of the current in the current path and send information thereabout to a control unit 12, comprising a CPU or connected to a control system, said unit adapted to control the contact members 1-4 in a way to be described further below. The control unit will in this way all the time know what the current instantaneously looks like and be instantaneously able to control the contact members in the way desired.

When energizing the capacitor bank 7, the function of this electric switching device is as follows: A current path Ic is created from the power device through the switch to the capacitor. A control unit 12, comprising a CPU (Central processing unit), firstly decides which two contact members, here the contact members 2 and 3 (see FIG. 3B), are to be opened so as to establish a temporary current path through the semiconductor device 8.

By connecting and disconnecting capacitors to a power device with a switch, the following sequences should be used.

FIG. 3A shows a simplified circuit diagram illustrating the electric switching device in an opened position. The capacitor is fully disconnected. The capacitor voltage level UC=0 o or the capacitor voltage level Uc>0. When opening the capacitor with Uc=0, i.e. the capacitor is completely discharged, when the voltage over the switch is zero or almost zero, two of the switches that feed the diode close, i.e. when the voltage is positive the pair of switches 1 and 4 closes. The method involves the charging of the capacitor to the same voltage level as the peak voltage level of the network as being the best voltage level for a connection without the creation of transients. Because only one conducting direction is used, the capacitor is gradually charged to its peak value. After a fourth period, i.e. the peak voltage value, the other pair of switches 2 and 3 is connected. After that the current is almost transientless.

Figure 4A:
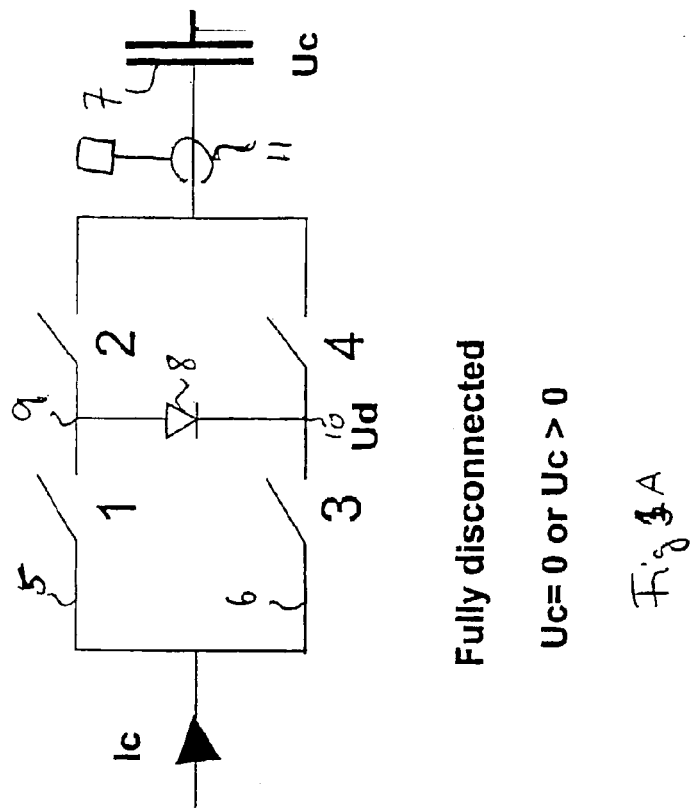
Figure 5A:
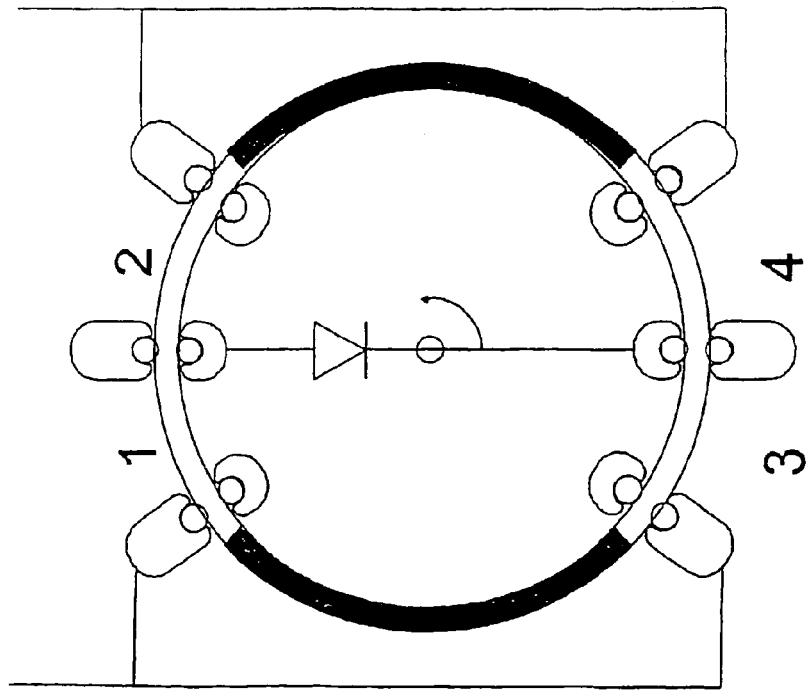

FIG. 3B shows simplified circuit diagram illustrating the electric switching device with breakers 1 and 4 is closed. The capacitor voltage level UC=0. FIG. 4A illustrates schematically the network voltage level, the capacitor voltage level and the capacitor current level when energizing the capacitor at voltage zero according to a preferred embodiment of the invention in a temporarily closed and opened position shown in FIG. 3B. Breakers 1 and 4 are closed at voltage zero and remain closed. The capacitor voltage Uc is the same as the network voltage U. The capacitor current Ic is positive.

FIG. 3C shows a simplified circuit diagram illustrating an electric switching device in a temporarily closed and opened position, respectively, utilized when energizing a capacitor bank at voltage zero and half-wave rectifying according to a first preferred embodiment of the invention. The capacitor voltage level UC>0 and breakers 1 and 4 are closed. FIG. 4B illustrates schematically the network voltage level, the capacitor voltage level and the capacitor current level when energizing capacitor according to a preferred embodiment of the invention in a temporarily closed and opened, otherwise shown in FIG. 3C. The capacitor voltage Uc is the same as the network voltage U. The capacitor current Ic is positive.

FIG. 3D shows a simplified circuit diagram illustrating an electric switching device in a closed position, utilized when energizing a capacitor bank at voltage zero and half-wave rectifying according to a first preferred embodiment of the invention. The capacitor is fully connected. Breakers 2 and 3 are closing at the network peak voltage Upeak, one-fourth of a period after breakers 1 and 4. FIG. 4C illustrates schematically the network voltage level the capacitor voltage level and the capacitor current level when energizing capacitor bank according to a preferred embodiment of the invention in a closed position, for instance shown in FIG. 3D. The capacitor voltage Uc is the same as the network voltage U. The capacitor current Ic is negative.

FIG. 3E shows a simplified circuit diagram illustrating an electric switching device in a temporarily closed and opened position, respectively, utilized when energizing a capacitor bank at voltage zero and half-wave rectifying according to a first preferred embodiment of the invention. Breakers 2 and 3 are opened at zero current. FIG. 4D illustrates schematically the network voltage level, the capacitor voltage level and the capacitor current level when energizing capacitor bank according to a preferred embodiment of the invention in a temporarily closed and opened position shown in FIG. 3E.

FIG. 3F shows a simplified circuit diagram illustrating an electric switching device in an opened position, after energizing a capacitor bank according to a first preferred embodiment of the invention. The capacitor is fully disconnected. The breakers 1 and 4 are disconnected after a fourth of a period after the breakers 2 and 3 is disconnected. The breakers 1 and 4 are also disconnected at voltage zero. The capacitor voltage level Uc is the same as the network peak voltage Upeak. FIG. 4E illustrates schematically the network voltage level, the capacitor voltage level and the capacitor current level when energizing capacitor bank according to a preferred embodiment of the invention in an opened position, for instance shown in FIG. 3F.

Thus, the decision to establish a temporary current path through the semiconductor device 8 depends upon in which position the current in the current path then is. In the position according to FIG. 3D, the entire current flows through the switching device through the two branches 5, 6 and nothing through the diode. When the connection is to take place, the current shall as rapidly as possible be transferred to flow through the diode instead. The current may be switched into the diode from a certain direction during that part of an alternating current period that is located between the time shortly before the diode becomes forward biased until the diode next becomes reversed biased. This means when a whole period is 20 ms in practice that an opening of the contact members according to FIG. 3E may take place, for example, about 2 ms before zero-crossing towards the forward biased direction until the next zero-crossing. When the wrong half-period of the alternating voltage for opening the contact members 2 and 3 according to these conditions prevails, the contact members 1 and 4 may then instead be immediately opened for establishing that temporary current path. Accordingly, this temporary current path may be established immediately after detecting the need for opening the switching device. By using an electrically controlled driving member, an electronic unit for the control thereof and a prediction of a future zero-crossing of the current the opening of this first contact member may be controlled to take place substantially at such a zero-crossing, which means within about 0.5 ms before and about 0.5 ms after such a zero-crossing. This means that the current to be commutated over to flow through the diode is small and the commutation may therefore take place quickly without any high demand for means for increasing the voltage across this contact member.

When the temporarily closed position illustrated in FIG. 3E is obtained by opening the contact members 2, 3, a small spark is created in the gap between the contacts of the respective contact member, which results in a voltage of usually 12-15 V, which will drive the transfer of the current through the diode 8.

Then, when the voltage across the switching device changes direction, no current will flow therethrough, but a voltage will be built up across the diode 8 then reverse biased and at least one of the other two contact members 1, 4 is now opened, so that the temporary current path is broken, in which this breaking may take place in an arc-free manner, since no current flows through the contact site at the time of the breaking. The completely open position according to FIG. 3A is thereby obtained. During this breaking it is important that it takes place so fast that the voltage across the diode 8 will not change direction again and start to conduct. Because the frequency of the opening of the contact members may be controlled in dependence upon the position of the alternating current, when a need for opening the switching device occurs the switching device may be brought between the closed position and the completely open position according to FIG. 3A within a period of time being substantially shorter than one period, usually always within 15 ms for a frequency of 50 Hz of the alternating current or 60 Hz.

By the fact that, in the closed position of the switching device, the current never flows through the diode 8, the contact members 1 and 4 only have to be dimensioned for the operating current, which may, for example be, 1000 A, whereas the diode is dimensioned for a possible short-circuit current, which in such a case could be as great as 25 kA or more. However, it only has to withstand that current for a very short time, and the dimensioning of the diode may be made without taking considerations any continuous operating current through the switching device. Furthermore, the diode has to be dimensioned for a returning voltage that for a short period of time is applied across after opening the two contact members first opened. This may, in the case of a network voltage of 12 kV, for example be about 20 kV. However, the very contact members of the switching device in the open position according to FIG. 3A, have to be able to withstand a considerably higher so-called impulse voltage, which in this case could be 75 kV.

In another preferred embodiment the connection is arranged with UC>0, i.e. the capacitor is still charged. Connection of the switching device is performed by the pair of switches that was last used to disconnect the switch. When the capacitor voltage is positive, the pair of switches 1 and 4 is connected when the voltage is zero. The diode conducts when the voltage level is above the voltage level of the capacitor and that leads to charging of the capacitor towards the voltage peak level. After a fourth period, i.e. at the peak voltage value, the two other pair of switches 2 and 3 are connected. After that, the current is almost transient less.

Alternatively, the decision can be made to connect pair of switches 1 and 4 when the voltage across the switch and the voltage have a positive derivative in the example described above. The pair of switches 2 and 3 is connected at peak voltage for the capacitor.

A preferred embodiment according to the invention is to use the zero voltage but with knowledge of which switches that were conducting the current. No further measuring is needed from the voltage level on the capacitor.

When disconnecting the capacitor the two switches open at the zero crossing of the current. Those two switches shall force the next period of the current to the diode. When the diode blocks the current, the other switch pair is opened.

In case of false firing of the switch and/or when a dangerously high current pulse is detected a signal is given to all switches/contactors to connect and a signal to the back-up-switch is given.

In another embodiment of the invention a switching device according to FIG. 6 is used. Two breakers 10 and 40 are used instead of four breakers.

In another embodiment of the invention the switching device also comprise current measuring members, an electronic unit adapted to carry out a current prediction algorithm and an electrically controlled driving member, such as a motor, for obtaining opening of the first contact member substantially at a zero-crossing of the current through the switching device.

The invention is not, of course, in any way restricted to the preferred embodiments described above, but many possibilities of modifications thereof would be apparent to a person skilled in the art without departing from the basic idea of the invention as defined in the claims.

It would, for example, be possible to replace each contact member by a series connection of a plurality of contact members. It would also be possible to use all kinds of breakers, such as vacuum breaker mechanical contacts, contactors or other load disconnectors. It would also be possible to replace the diodes shown above by other semiconductor devices having the ability to block in at least one direction in accordance with the discussion above.

It is not absolutely necessary that the closing and the opening of the contact members of a switching device according to the invention should take place through movement of two movable contact members included in the same unit and it is not even necessary that it takes place through movement of a movable contact part in common with a plurality of contact members. Each of the contact members could instead be completely separately controllable and for example consist of so-called Thomson-coils, which are then triggered according to the same time sequence as illustrated in, for example FIGS. 3A-3F.

FIGS. 5A-5F show an electric switching device according to a first preferred embodiment of the invention in a closed, temporarily closed and opened position, respectively.

FIG. 6 shows a simplified circuit diagram illustrating an electric switching device in a closed, temporarily closed and opened position, respectively, utilized when energizing a capacitor bank at voltage zero and half-wave rectifying according to another preferred method of the invention. A breaker 10 is coupled in parallel with a diode 8 and then both in series with a breaker 40 as a half-wave rectifier. During the first fourth of a period the breaker 40 is closed. The diode should be connected in such a way that the current starts to flow directly after voltage zero. After one-fourth of a period the diode is short-circuited.

The invention also relates to a switch gear for supply of electricity within industry or in distribution and transmission networks provided with an electric switching device according to the invention. The method according to the invention is also excellently suited for being carried out through a computer program provided with suitable program steps, and the invention also relates to such a program as well as a computer-readable medium on which such a program is recorded. The previously mentioned patent application WO0137298 is hereby incorporated by this reference.

A control system for controlling a switch when energizing a capacitor bank according to the invention may comprise components from any of the list of: a computer such as a tablet personal computer PC and a computer program.

The communications to the switching device via a data network also comprise a computer data signal in another aspect of the invention. The computer data signal for monitoring and/or controlling one or more switching devices is embodied in a carrier wave. The data signal complies with one or more formats, for example internally formatted as an XML file, and includes means to identify the sending elements and the type of data such as saved events, saved alarms, configured overload protection, etc., for said device.

The data obtained from the device are analysed by any suitable statistical or modelling or simulation method.

The microprocessor, or processors, of a device including controlling means, comprises at least one central processing unit CPU performing the steps of the method according to an aspect of the invention. This is performed with the aid of one or more computer programs, which are stored at least in part in memory accessible by the processor. It is to be understood that the computer programs are also being run on one or more general-purpose industrial microprocessors or computers instead of a specially adapted computer.

The computer program comprises computer program code elements or software code portions that make the computer perform the method using equations, algorithms, data and calculations previously described. A part of the program may be stored in a processor as above, but also in an ROM, RAM, PROM, EPROM or EEPROM chip or similar memory means. The program in part or in whole may also be stored on, or in, another suitable computer-readable medium such as a magnetic disc, CD-ROM or DVD disk, hard disk, magneto-optical disk, magneto-optical memory storage means, in volatile memory, in flash memory, as firmware, or stored on a data server. Removable memory media such as removable hard drives, bubble memory devices, flash memory devices and commercially available proprietary removable media such as the Sony memory stick and memory cards for digital cameras, video cameras and the like may also be used.

The computer programs described may also be arranged in part as a distributed application capable of running on several computers or computer systems at more or less the same time.

A database may also contain information to be used in a method in an industrial control system for controlling a process or equipment, according to the invention.

A data communication signal may also be used for controlling at least one of the switches in an electrical network for energizing a capacitor bank. The data communication signal comprises information for controlling a process or switches in an electrical network.

This invention is applicable in all industrial areas where capacitor banks are mandated and other areas where capacitor banks are under discussion.

The computer programs described may also be arranged in part as a distributed application capable of running on several different computers or computer systems at more or less the same time.

The invention claimed is:

1. A method for energizing a capacitive load which comprises the steps of:
   connecting a connecting device to the capacitive load and to an alternating current power source, said connecting device comprising:
   a diode, and connecting parts each having an open position and a closed position,
   wherein during a connection sequence said connecting parts are selectively closed such that the diode is connected between the power source and the capacitive load when the power source is approximately 0 volts, and the diode is by-passed when a voltage from the power source substantially reaches a peak value after the diode has become forward biased; and
   wherein during disconnection sequence said connecting parts are selectively opened such that the diode is connected between the power source and the capacitive load when a current in the capacitive load is approximately 0 amps and the diode is disconnected from between the power source and the capacitive load when the power source is approximately 0 volts;
   wherein said connecting parts are selectively opened and closed based on the charging of the capacitive load.

2. The method according to claim 1, wherein a first connecting part and a second connecting part are connected in series between the power source and the capacitive load in the connecting device, wherein the diode is connected in parallel with the second connecting part, and wherein the first connecting part is closed when the diode is in the reverse state, and the second connecting part is closed when the voltage from the power source reaches the peak value after the diode has come into the forward conducting state.

3. The method according to claim 1, wherein in the connecting device a first connecting part and a second connecting part are connected in series in a first branch, wherein a third connecting part and a fourth connecting part are connected in series in a second branch, the first branch and the second branch being parallel connected between the power source and the capacitive load, and the diode is connected between the first connecting part and the second connecting part at a first end and to the third connecting part and the fourth connecting part at a second end, the connecting parts are closed in pairs, wherein a first pair is the first connecting part and the fourth connecting part, and wherein a second pair is the second connecting part and the third connecting part, the first pair is closed when the diode in a reverse state is closed first, and the second pair is closed substantially when the diode has come into the forward conducting state.

4. The method according to claim 1, wherein said capacitor is substantially charged to a peak value of the alternating current power source.

5. A system for energizing a capacitive load connected to an alternating current power source comprising:
   a connecting device controlled by a control unit, said connecting device comprising,
   a diode, and
   connecting parts each having an open position and a closed position,
   said control unit controlling the connecting parts during a connection sequence such that the diode is connected between the power source and the capacitive load when the power source is approximately 0 volts, and the diode is by-passed when the voltage from the power source substantially reaches a peak value after the diode has become forward biased; and
   said control unit controlling the connecting parts during a disconnection sequence such that the diode is connected between the power source and the capacitive load when a current in the capacitive load is approximately 0 amps and the diode is disconnected from between the power source and the capacitive load when the power source is approximately 0 volts;
   wherein said connecting parts are selectively opened and closed based on the charging of the capacitive load.

6. The system according to claim 5, wherein the connecting device comprises a first connecting part and a second connecting part connected in series between the power source and the capacitive load, wherein the diode is connected in parallel with the second connecting part, the control unit controls the connecting parts such that the first connecting part is closed when the diode is in the reverse state, and the second connecting part is closed when a voltage from the power source reaches a peak value after the diode has come into the forward conducting state.

7. The system according to claim 5, wherein the connecting device comprises a first connecting part, a second connecting part, a third connecting part and a fourth connecting part, wherein the first connecting part and the second connecting part are connected in series in a first branch, wherein the third connecting part and the fourth connecting part are connected in series in a second branch, the first branch and the second branch are parallel connected between the power source and the capacitive load, the diode is connected between the first connecting part and the second connecting part in one end and in the other end between the third connecting part and the fourth connecting part, and the connecting parts are individually operated such that the connecting parts are closed in pairs, the first pair is the first connecting part and the fourth connecting part, and the second pair is the second connecting part and the third connecting part, and the control unit controls the connecting parts such that the first pair is closed when the diode in a reverse state, and the second pair is closed when the voltage from the power source substantially reaches the peak value and after the diode has come into the forward conducting state.

8. The system according to claim 5, wherein said capacitive load comprises a capacitor.

9. The system according to claim 5, wherein said capacitive load comprises a cable.

10. The system according to claim 5, wherein said connecting parts comprise at least one of: mechanical switches, breakers or disconnectors, vacuum breakers, indoor and outdoor switches, contactors; thyristors, transistors, and semiconductors.

11. An electrical power system including at least one system for energizing a capacitive load according to claim 5.

12. A control system comprising means for controlling the energizing of a capacitive load according to claim 5.

13. The system according to claim 5, wherein said capacitor comprises a bank of capacitors.

\* \* \* \* \*